United States Patent Office 2,738,358
Patented Mar. 13, 1956

2,738,358
PROCESS FOR THE PRODUCTION OF SILICONES

Egon Wiberg and Paul Buchheit, Munich, Germany, assignor to Firma Sud-Chemie A. G., Munich, Germany, a German company No Drawing. Application October 20, 1952, Serial No. 315,829

14 Claims. (Cl. 260—448.2)

Silicones have hitherto been prepared from organic halogen-silicon compounds by hydrolysis and condensation. The costs of production of the starting materials in such cases are relatively high.

According to the present invention, silicones can be produced by using less expensive starting materials.

The process according to the invention consists in that silicon-halogen compounds of the general type (1)

$$H_nSiX_{4-n}$$

wherein X=halogen, preferably chlorine, $n=0$ or 1— example $SiCl_4$, $SiBr_4$, $HSiCl_3$ or the mixture of chlorsilanes which is obtained in the reaction of hydrogen chloride with silicon or ferrosilicon below 300° C.—are reacted in a reaction process with ethers or with silicic acid esters of the general type (2)

$$H_nSi(OR)_{4-n}$$

$R=CH_3$, $C_2H_5$, isomeric $C_3H_7$, normal $C_3H_7$, isomeric $C_4H_9$, normal $C_4H_9$ (this enumeration being intended to explain the claim, but not to limit it in any way) $n=0$ or 1 in the presence of elements or alloys which are capable of reacting with alkyl compounds in which the alkyl radical has electronegative character.

As such, there comes into question: Na, Li, Mg, Cd, Zn, Hg, Al and Si, or Fe-Si, Si-Al and Mg-Fe-Si, in a quantity which is equivalent to the introduced quantity of halogen in the compounds of the type 1 but an excess of approximately 10% is preferably employed, e. g. 5 to 15%.

The reactions can be conducted at temperatures between about 100° and 300° C., pressures between 1.5 and 130 atm. preferably being maintained.

Example 1

105 ccs. of silicon tetrachloride (0.915 mol), 470 ccs. of diethyl ether (4.56 mol) and 50 g. of magnesium (2.055 mol) activated with 1 g. iodine by heating were heated for 10 hours at 170° in a 1 litre agitator-type autoclave with addition of 10 cc. ethyl bromide. (The iodine activation of the magnesium is effected in a suitable glass bulb by covering the iodine with the total quantity or a part of the magnesium and briefly heating at about 300° C. over a bare flame. The contents of the bulb are allowed to cool with exclusion of air.) The maximum pressure was about 130 atm. After cooling the autoclave, the contents were extracted with ether. Upon distillation, the dark-yellow oily reaction product, amounting to about 60 g. supplied on distillation, in addition to viscous resin which is not adapted to be distilled, provided colourless oils of different volatility and viscosity.

Example 2

15.3 ccs. of silicon tetrachloride (0.134 mol) and 29.7 ccs. of tetraethyl ester of ortho-silicic acid (0.136 mol) were caused to react with 15 g. iodine-activated magnesium chippings for 6 hours 150–180° and a positive pressure of about 800 mm. of mercury. When the main quantity of metal chippings had been converted into yellowish-greenish salts, the contents of the reaction vessel were extracted with ether, the extract vaporised and the crude reaction product, about 10–11 ccs. of a yellowish oil, were distilled in vacuo. It was found that, in addition to a yellow foamy substance which could not be distilled and which was slimy in the hot state and brittle in the cold state, it contained a mixture of colourless oils of different volatility and different viscosity.

Example 3

3 g. of a very fine silicon powder alloyed with 1.5% copper and 9.5% iron were heated together with 11.35 ccs. silicon tetrachloride and 50 ccs. diethyl ether for 20 hours at 300° in the autoclave. After 3 hours, the pressure was 80 atm., after 5 hours, 140 atm. and on completion of the reaction, there was a residual pressure of 35 atm. The ether extraction of the fluorescent contents of the autoclave supplied about 6 g. of a practically chloride-free viscous silicone oil.

Example 4

15 ccs. of silicon chloroform ($SiHCl_3$), 65 ccs. of diethyl ether and about 6 g. of iodine-activated magnesium were heated with about 1 cc. ethyl bromide for 5 hours at 190–210° in an autoclave. After evaporating the ether, with which the cooled contents of the autoclave were extracted, there were obtained about 10 ccs. of dark-coloured oil which contained a non-distillable sticky resin in addition to transparent lightly volatile to difficultly volatile transparent oils.

Example 5

As described in Example 1, instead of silicon tetrachloride, 1 mol silicon tetrabromide, 5 mol diethyl ether and 2.2 mol magnesium activated with iodine were caused to react with addition of 10 ccs. ethyl bromide for 10 hours at 170° and a stirring speed of 120 R. P. M. A readily flowing oil was produced, the main quantity of which distilled over at a pressure of 0.1 Torr. at 180°.

We claim:

1. Process for the production of silicones comprising reacting at a temperature above about 100° C. a first compound selected from the group consisting of ethers of the formula ROR and silicic acid esters of the formula $H_nSi(OR)_{4-n}$, wherein R is a hydrocarbon radical and $n$ is zero or one with a second silicon-halogen compound of the general type $$H_nSiX_{4-n}$$

wherein X=halogen, $n=0$ or 1 in the presence of an element selected from the group consisting of sodium, lithium, magnesium, cadmium, zinc, mercury, aluminum and silicon and alloys of silicon, aluminum and magnesium and which is capable of reacting with alkyl compounds in which the alkyl radical has electronegative character.

2. Process for the production of silicones comprising reacting at a temperature above about 100° C. a first compound selected from the group consisting of ethers of the formula ROR and silicic acid esters of the formula $H_nSi(OR)_{4-n}$, wherein R is a hydrocarbon radical and $n$ is zero or one with a second silicon-halogen compound of the general type $$H_nSiX_{4-n}$$

wherein X=halogen, $n=0$ or 1 in the presence of an alloy selected from the group consisting of alloys of magnesium, aluminum and silicon and which is capable of reacting with alkyl compounds in which the alkyl radical has electronegative character.

3. Process according to claim 1, wherein the said second compound is silicon tetrachloride.

4. Process according to claim 1 wherein said element is present in amounts at least equivalent to the amount of halogen present in the reaction mass.

5. Process according to claim 4 wherein the said element is an alloy of silicon.

6. Process of claim 5 wherein said silicon alloy is an iron silicon alloy.

7. Process of claim 5 wherein said silicon alloy is an aluminum silicon alloy.

8. Process of claim 5 wherein said silicon alloy is an iron-copper silicon alloy.

9. Process of claim 1 wherein said element is magnesium.

10. Process of claim 4 wherein said element is magnesium.

11. The process of claim 2 wherein said alloy is an alloy of silicon.

12. The process of claim 3 wherein the said element is an alloy of silicon.

13. The process of claim 12 wherein said alloy is an iron-copper silicon alloy.

14. The process of claim 3 wherein said element is magnesium.

References Cited in the file of this patent
UNITED STATES PATENTS

| | | |
|---|---|---|
| 2,426,122 | Rust | Aug. 19, 1947 |
| 2,521,267 | Tiganik | Sept. 5, 1950 |